(12) United States Patent
Campbell et al.

(10) Patent No.: US 6,341,409 B1
(45) Date of Patent: Jan. 29, 2002

(54) CLIP DISK ASSEMBLY FOR CARRYING CANDLE WICK EYELETS

(75) Inventors: Bruce M. Campbell, Mattituck; Hershell P. Sablowski, Patchogue, both of NY (US)

(73) Assignee: Stimpson Co., Inc., Bayport, NY (US)

( * ) Notice: Subject to any disclaimer, the term of this patent is extended or adjusted under 35 U.S.C. 154(b) by 0 days.

(21) Appl. No.: 09/584,044

(22) Filed: May 30, 2000

(51) Int. Cl.[7] .......................... B23P 19/00; B21D 41/00
(52) U.S. Cl. .................... 29/33 R; 29/34 R; 72/405.03; 72/442
(58) Field of Search ................ 29/35 R, 33 J, 29/432, 34 R; 72/405.03, 418, 420, 424, 442; 425/803, 112, 517

(56) References Cited

U.S. PATENT DOCUMENTS

| | | | | |
|---|---|---|---|---|
| 3,907,487 A | * | 9/1975 | Reiher | 425/517 |
| 3,958,909 A | * | 5/1976 | Estrugo | 425/112 |
| 3,964,858 A | * | 6/1976 | Marik | 29/432 X |
| 4,044,985 A | * | 8/1977 | Ghany | 425/803 X |
| 4,291,458 A | * | 9/1981 | Flinn | 29/33 R |
| 4,549,419 A | * | 10/1985 | Trost et al. | 72/418 X |
| 5,913,934 A | * | 6/1999 | Inoue et al. | 72/442 |

FOREIGN PATENT DOCUMENTS

| | | | | |
|---|---|---|---|---|
| DE | 3918591 | * | 9/1990 | 29/34 R |
| SU | 747604 | * | 7/1980 | 72/405.032 |
| SU | 755382 | * | 8/1980 | 72/405.032 |
| SU | 755383 | * | 8/1980 | 72/405.032 |

* cited by examiner

*Primary Examiner*—William Briggs
(74) *Attorney, Agent, or Firm*—Galgano & Burke

(57) ABSTRACT

A clip disk assembly according to the invention includes an adapter hub which attaches to the motor of an existing crimping machine and a plurality of clip disks, each being removably attachable to the adapter hub. Each clip disk is provided with a different sized peripheral notches to accommodate a different sized eyelet. According to the presently preferred embodiment, the adapter hub has four threaded peripheral studs and the clip disks have four corresponding holes. Four wing nuts are used to removably attach the clip disks to the adapter hub. Preferably, one stud has a larger boss than the others and one hole in the clip disks is correspondingly larger. The assembly permits changing of clip disks in about one minute.

6 Claims, 2 Drawing Sheets

US 6,341,409 B1

CLIP DISK ASSEMBLY FOR CARRYING CANDLE WICK EYELETS

This application is related to co-pending applications Ser. No. 09/584,041, entitled "Method and Apparatus for Impregnating a Candle Wick with Candle Wax", Ser. No. 09/584,043, entitled "Multi-Part Candle Wick Die Plates", and Ser. No. 09/584,042, entitled "Self-Centering Crimping Tool for Securing an Eyelet to a Candle Wick", all filed simultaneously herewith, the complete disclosures of which are hereby incorporated by reference herein.

BACKGROUND OF THE INVENTION

1. Field of the Invention

The invention relates to the manufacture of candles. More particularly, the invention relates to the manufacturing of a wax impregnated candle wick. Most particularly, the invention relates to a clip disk assembly used in the manufacture of a wax impregnated candle wick for attaching an eyelet to the wick.

2. State of the Art

It is well known in the art of candle making to pass a wick material through a bath of molten candle wax to impregnate the wick with wax. In the mass production of candles, a continuous string of wick material (cotton, paper, or other material) is fed through a series of operations including bathing the wick in molten wax. The state of the art apparatus for bathing the wick material is usually a single idler pulley or grooved stud located below the surface of the molten wax bath. The wick material is guided by pulleys or grooved studs to the bath whereupon it is fed through the bath by travelling under the single idler pulley or grooved stud which is located beneath the surface of the molten wax. Upon exiting the bath, the wax impregnated wick is passed through one or more dies whereby excess wax is trimmed and the final diameter of the wick is determined. Finally, the semi-finished wick is fed to an eyelet crimping station. The wick is fed through the eyelet. The eyelet is crimped, and the wick is cur to size. The eyelet prevents the wick from passing through the bore of a candle which has been molded without the wick and then bored to accept the wick.

State of the art machines for crimping an eyelet to a candle wick include an indexed circular work station having a rotatable clip disk with a plurality of peripheral notches. The notches are dimensioned to hold the eyelets. As an eyelet is indexed to position, a wick is inserted and the eyelet is crimped by a pneumatically driven crimping tool. State of the art crimping machines use a clip disk having notches large enough to hold the largest eyelet. These disks do not work well with smaller eyelets. Smaller eyelets can fall out of the notch or move around in the notch during crimping which results in non-uniform crimping.

SUMMARY OF THE INVENTION

It is therefore an object of the invention to provide an improved clip disk assembly for securing an eyelet to a candle wick.

It is also an object of the invention to provide an improved clip disk assembly for securing an eyelet to a candle wick which avoids the disadvantages of the prior art.

It is another object of the invention to provide an improved clip disk assembly for securing an eyelet to a candle wick which holds different sized eyelets securely.

It is still another object of the invention to provide an improved clip disk assembly for securing an eyelet to a candle wick which is retro-fittable on an existing crimping machine.

It is yet another object of the invention to provide an improved clip disk assembly for securing an eyelet to a candle wick which has a long life with little wear.

It is still another object of the invention to provide an improved clip disk assembly for securing an eyelet to a candle wick which is suitable for an assembly line manufacturing process.

In accord with these objects which will be discussed in detail below, the clip disk assembly according to the invention includes an adapter hub which attaches to the motor of an existing crimping machine and a plurality of clip disks, each being removably attachable to the adapter hub. Each clip disk is provided with a different sized peripheral notches to accommodate a different sized eyelet. According to the presently preferred embodiment, the adapter hub has four threaded peripheral studs and the clip disks have four corresponding holes. Four wing nuts are used to removably attach the clip disks to the adapter hub. Preferably, one stud has a larger boss than the others and one hole in the clip disks is correspondingly larger. The assembly permits changing of clip disks in about one minute.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
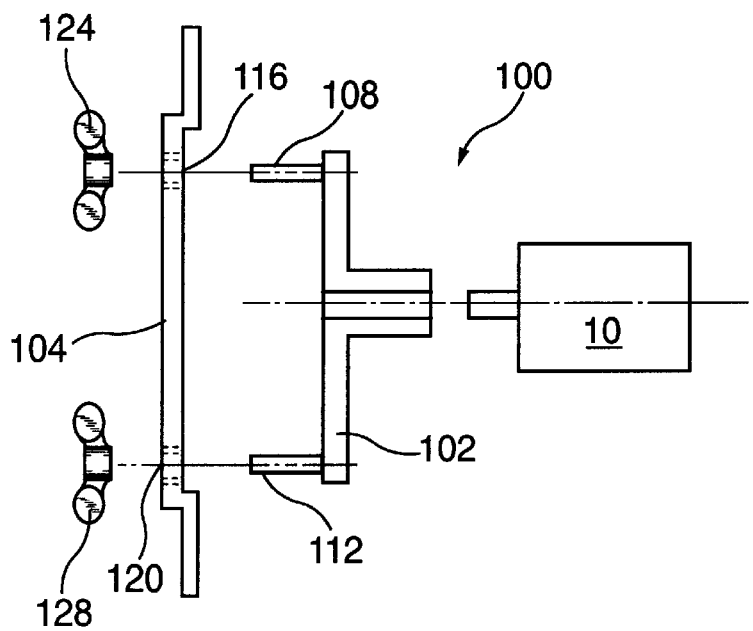
FIG. 1 is an exploded longitudinal section of a clip disk assembly according to the invention with a motor of a crimping machine.
Figure 2:
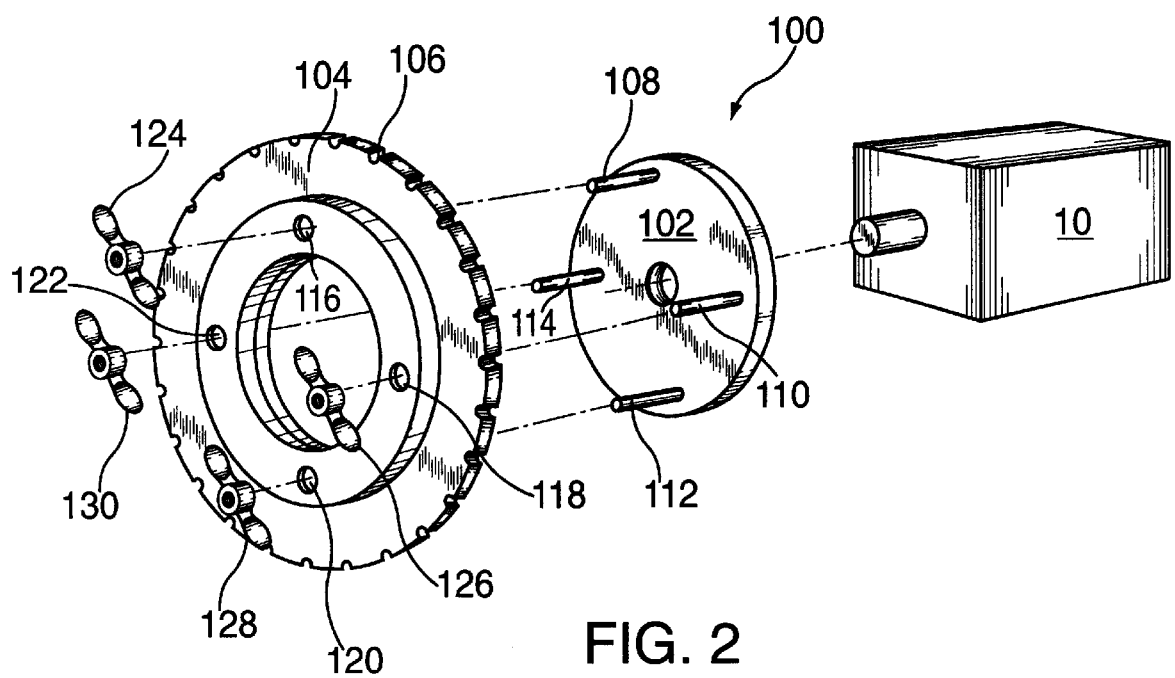
FIG. 2 is an exploded perspective view of a clip disk assembly according to the invention with a motor of a crimping machine.
Figure 3:
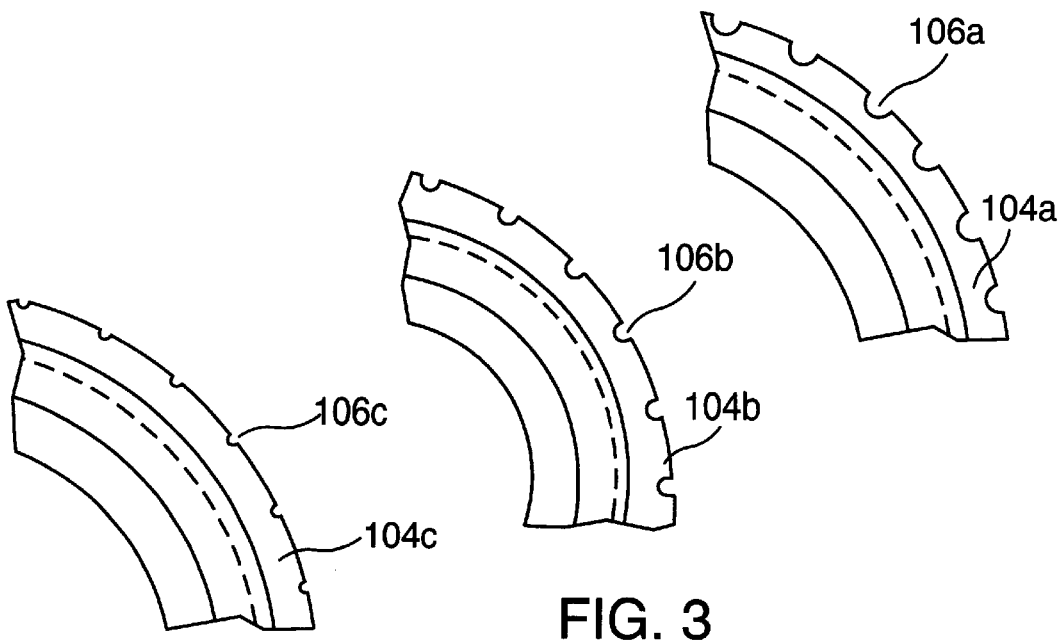
FIG. 3 is a schematic illustration of a plurality of clip disks each having different sized peripheral notches.

Referring now to FIGS. 1 through 3, the clip disk assembly 100 according to the invention includes an adapter hub 102 which attaches to the motor 10 of an existing crimping machine (not shown) and a plurality of clip disks 104, 104a–104c, each being removably attachable to the adapter hub 102. Each clip disk 104 is provided with a different sized peripheral notches 106 (106a–106c) to accommodate a different sized eyelet (FIG. 4).

According to the presently preferred embodiment, the adapter hub 102 as four threaded peripheral studs 10q, 110, 112, 114 and the clip disks 104 have four corresponding holes 116, 118, 120, 122. Four wing nuts 124, 126, 128, 130 are used to removably attach the clip disks 104 to the adapter hub 102. Preferably, one stud has a larger boss than the others and one hole in the clip disks is correspondingly larger. The assembly permits changing of clip disks in about one minute. According to the preferred embodiment, the clip disks are hardened to 49 Rockwell for long life without wear.

Figure 4:
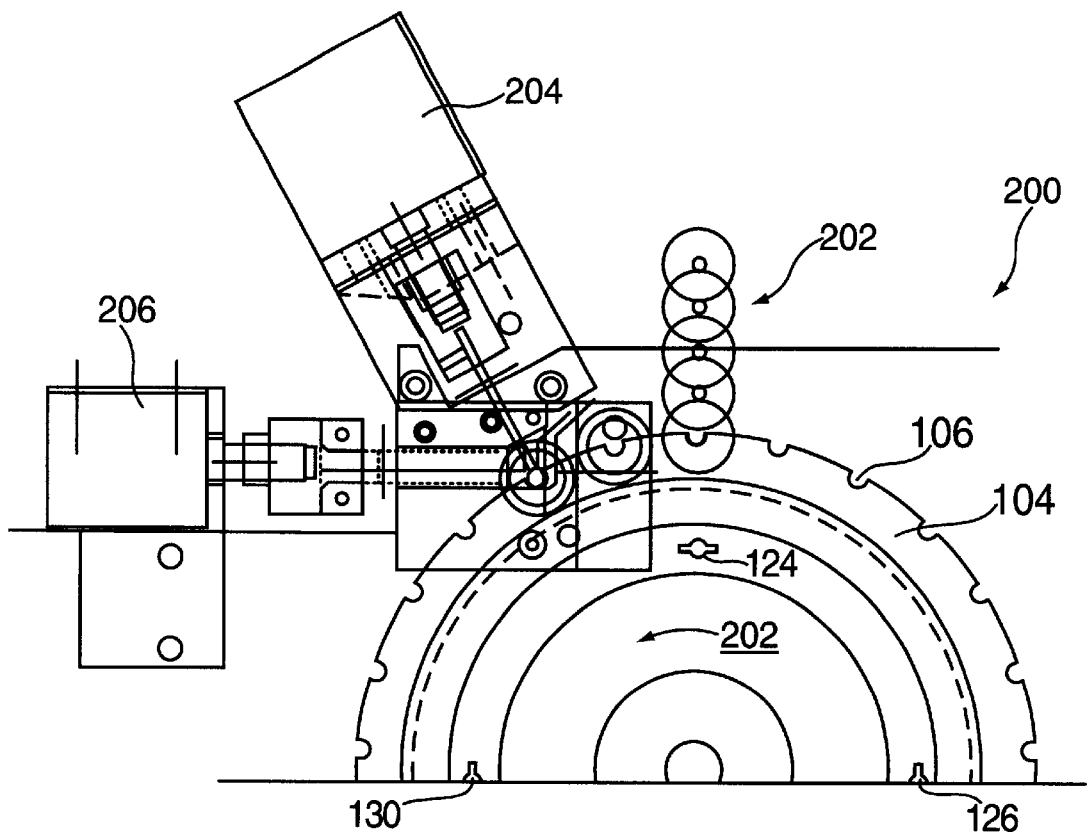
FIG. 4 is a schematic view of a crimping machine incorporating the invention.

FIG. 4 illustrates a crimping machine incorporating the invention. The machine 200 includes the hub 102 and clip disk 104 as described above, as well as means for dispensing eyelets 202 into notches in the clip disk 104, pneumatic crimping means 204, and means for advancing and cutting wick material 206. Those skilled in the art will appreciate that an eyelet is dispensed into a notch of the clip disk 104. The clip disk 104 is rotated until the eyelet is adjacent the crimping means 204. The means for advancing and cutting inserts a length of wick material through the eyelet; and the crimping means presses the eyelet crimped onto the wick.

There has been described and illustrated herein a clip disk assembly for carrying wick eyelets. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A crimping machine for crimping eyelets to candle wicks, comprising:
    a) an eyelet dispenser;
    b) a pneumatic crimping device spaced apart from said eyelet dispenser;
    c) a rotatable hub spaced apart from said eyelet dispenser and said pneumatic crimping device, said rotatable hub having first coupling means; and
    d) a plurality of clip disks, each having different sized peripheral notches and each having second coupling means for releasably coupling to said first coupling means, wherein
    when one of said clip disks is coupled to said rotatable hub, said peripheral notches are adjacent to said eyelet dispenser and said crimping device such that rotation of said rotatable hub moves an eyelet from said dispenser to a position adjacent to said crimping device wherein it can be crimped by said crimping device.

2. A crimping machine according to claim 1, further comprising:
    e) wick material delivery and cutting means for threading wick material through an eyelet and cutting wick material to length, said wick material delivery and cutting means being located adjacent to said rotatable hub.

3. A crimping machine according to claim 1, wherein:
    said first coupling means includes a plurality of threaded studs.

4. A crimping machine according to claim 3, wherein:
    said first coupling means includes a plurality of wing nuts.

5. A crimping machine according to claim 4, wherein:
    said second coupling means includes a plurality of mounting holes adapted to receive said threaded studs.

6. A crimping machine according to claim 5, wherein:
    said studs are not all the same diameter and said mounting holes have diameters corresponding to said studs.

* * * * *